(12) United States Patent
Sahm et al.

(10) Patent No.: US 6,241,436 B1
(45) Date of Patent: Jun. 5, 2001

(54) ADJUSTMENT AND/OR ALIGNMENT ARRANGEMENT

(75) Inventors: Detlef Dieter Sahm, Lichtenwald; Rolf Wezel, Metzingen, both of (DE)

(73) Assignee: Sauter Feinmechanik GmbH, Metzingen (DE)

( * ) Notice: Subject to any disclaimer, the term of this patent is extended or adjusted under 35 U.S.C. 154(b) by 0 days.

(21) Appl. No.: 09/323,855

(22) Filed: Jun. 2, 1999

(30) Foreign Application Priority Data

Jun. 3, 1998 (DE) .............................................. 198 24 692

(51) Int. Cl.⁷ ...................................................... B23C 1/12
(52) U.S. Cl. ......................... 409/201; 409/144; 409/215
(58) Field of Search ................................... 409/144, 201, 409/211, 215, 232, 231

(56) References Cited

U.S. PATENT DOCUMENTS

| | | | | |
|---|---|---|---|---|
| 2,199,379 | * | 5/1940 | Tornebohm | 409/144 |
| 2,562,661 | * | 7/1951 | Fisher et al. | 409/144 |
| 3,086,426 | * | 4/1963 | Brodbeck | 409/211 |
| 3,114,294 | * | 12/1963 | Wright | 409/144 |
| 3,712,752 | * | 1/1973 | Varga | 409/201 |
| 4,085,508 | * | 4/1978 | Gyongyosi | 409/118 |
| 4,128,043 | * | 12/1978 | Grassl | 409/232 |
| 4,836,725 | * | 6/1989 | Horsky et al. | 409/201 |
| 5,017,063 | * | 5/1991 | Tsay | 409/215 |
| 5,188,493 | * | 2/1993 | Heel et al. | 409/201 |
| 5,915,896 | * | 6/1999 | Koczarski et al. | 409/232 |

FOREIGN PATENT DOCUMENTS

| | | |
|---|---|---|
| 3318603A1 | 11/1984 | (DE) . |
| 3150355C2 | 4/1987 | (DE) . |
| 3929802C1 | 11/1990 | (DE) . |
| 19548151A1 | 7/1997 | (DE) . |

OTHER PUBLICATIONS

DIN No. 69880–11, Sep. 1994.

\* cited by examiner

*Primary Examiner*—Steven C. Bishop
(74) *Attorney, Agent, or Firm*—Roylance, Abrams, Berdo & Goodman, L.L.P.

(57) ABSTRACT

An adjustment and/or alignment arrangement positions a toolholder (10) relative to a toolholder mounting (12) in machine tools in a pivot movement. An adjustment part (30) cooperates with a setting part (32). The setting part (32) is provided with a mounting housing (40), in which, counter to the effect of an accumulator (34), a guiding part (36) for the adjustment part (30) is guided longitudinally slidably. The guiding part (36) can be controlled by an operation part (38). The adjustment and/or alignment arrangement is of simple construction, and consequently, is of low cost, while to a great extent facilitates the desired adjustment simply and operationally securely.

14 Claims, 2 Drawing Sheets

ADJUSTMENT AND/OR ALIGNMENT ARRANGEMENT

FIELD OF THE INVENTION

The present invention relates to an adjustment and/or alignment arrangement for the positioning of a toolholder relative to a toolholder mounting in machine tools. More particularly, the present invention relates to such arrangement involving a pivotal movement, with an adjustment part which cooperates with a setting part.

BACKGROUND OF THE INVENTION

Toolholders, such as spindleheads having drivable or rotatably processing tools, are constructed in the turrets of turning machines, lathes or drills, for example, to facilitate off-center machining of turning parts on a turning machine, such as a machine tool. The interface or cutting point for that processing is determined between spindleheads and tool disks of tool turrets by the DIN 69880-11 (publication September 1994, page 305ff) standard. With such spindleheads, in which the tool axis of the drivable or rotatable cutting tool is identical with the central axis of the mounting bore according to the aforementioned DIN standard, and the bore is aligned parallel to the normal or vertical axis of the turning machine, it is not necessary to adjust the cutting tool. An adjustment is necessary, however, in the case of spindleheads in which the tool axis is not identical with the central axis of the mounting bores as in the aforementioned DIN standard. In these cases, for precise machining, the tool point must be aligned first along the normal or vertical axis of the machine tool, especially of a turning machine. Similarly, with the so-called counter-rotation of the spindle, the central axes of the mounting bores are arranged in a star arrangement on the tool disk of the tool turret, whereby the interior processing tools are first to be aligned parallel to the rotary axis of the turning machine.

A toolholder, for example in the form of a spindlehead, can be centered with the aid of the mounting bore, as in the cited DIN standard. Although it can be centered in axial alignment, it cannot be aligned relative to another axis extending perpendicular to the bore central axis. In that case, there are other known adjustment and/or alignment arrangements. With a known adjustment and/or alignment arrangement, such as in DE 39 29 802 C1, the toolholder includes two set screws arranged opposite one another serving as setting members. The set screws work together on an adjustment part which is arranged on the toolholder mounting. This solution has the drawback that any toolholder with any arrangement in the associated toolholder mounting is to be adjusted in the selected setting by means of the setting or adjustment screws. Modifications of the adjustment and/or alignment arrangement occur with multiple removals and insertions of the toolholder, which lead to inaccuracies. Also, the adjustment process by means of manipulation of two set screws separately from one another is not simple and is correspondingly time-consuming.

To overcome the drawbacks of this state of the art, DE 195 48 151 A1 discloses providing associated adjustment parts as an adjustment and/or alignment arrangement on both the toolholder and the toolholder mounting. The adjustment parts, upon their interconnection as form-locking elements, engage in one another without play. However, the accurate and precise fitting in one another without play requires high manufacturing cost for production of the arrangement, so that this solution turns out to be very costly.

A toolholder insert disclosed DE 31 50 355 C2 is especially for drill rods or the like with a shaft-like toolholder for a cutting insert. An adjustment sheathing is screwed onto an exterior threading of the toolholder. The adjustment sheathing engages the tool holder with a flange on the one side of a stationary collar, and with a spring ring or the like mounted on the adjustment sheathing. The toolholder is supported on the one hand on the other side of the collar and on the other hand on a collar-like detent of the adjustment sheathing. Axial tightness between structural parts is produced by the spring ring. Relative positioning by pivoting the toolholder cannot be attained with the known axial adjustment mechanism. Furthermore, the known arrangement is complicated in set-up and is expensive in production because of the plurality of parts. It is also difficult to handle.

SUMMARY OF THE INVENTION

Objects of the present invention are to provide an adjustment and/or alignment arrangement which is of simple construction and consequently of low cost, while to a great extent facilitates the desired adjustment simply and operationally securely.

The foregoing objects are basically obtained by an adjustment arrangement for pivotally positioning a toolholder relative to a toolholder mounting in a machine tool, comprising an adjustment part and a setting part coupled to the adjustment part. The setting part has a mounting housing, a guiding part receiving the adjustment part and being guided for longitudinal sliding motion in the mounting housing, an accumulator biasing the guiding part in one longitudinal direction of the sliding motion of the guiding part, and an operation part controlling the guiding part in an opposite longitudinal direction of the sliding motion of the guiding part.

With a relatively few simple structural components according to the present invention, an operationally secure adjustment and/or alignment arrangement can be realized. Highly precise, costly adaptations between the adjustment part and the setting part can be dropped. Furthermore, the setting and adjustment procedure can be undertaken effectively by means of one single operation part, which remarkably simplifies manipulation of the adjustment and/or alignment arrangement, especially in subsequent operation on the processing machines.

With the adjustment and/or alignment arrangement according to the present invention in the same type and direction of operation, the pivot adjustment movement can be carried out for the relative positioning between the toolholder and the toolholder mounting in such a manner that precise adjustment of the driving axle with the machine tool main axle, for example, the normal or vertical axis, is possible.

In one preferred embodiment of the adjustment and/or arrangement according to the present invention, the adjustment part is mounted securely on the toolholder mounting and the setting part is securely mounted on the toolholder. Furthermore, the setting part can be configured as a sliding block having an engagement point for the adjustment part. Thus, the sliding block together with the adjustment part can assume a stationary position; and the setting part with the mounting housing is moved together with the toolholder around the relevant stationary structural group. The basic machine structural parts, such as spring-biased sliding blocks provided guided in housings, are described for a tool changing device described in De 33 18 603 A1, the subject matter of which is hereby incorporated by reference.

Having the accumulator formed of at least one compression spring, particularly a disk spring, has been proven to be particularly operationally secure. The spring can engage on one side of the sliding block; and the operation part in the form of an operating screw can engage on its other side.

Other objects, advantages and salient features of the present invention will become apparent from the following detailed description, which, taken in conjunction with the annexed drawings, disclose a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
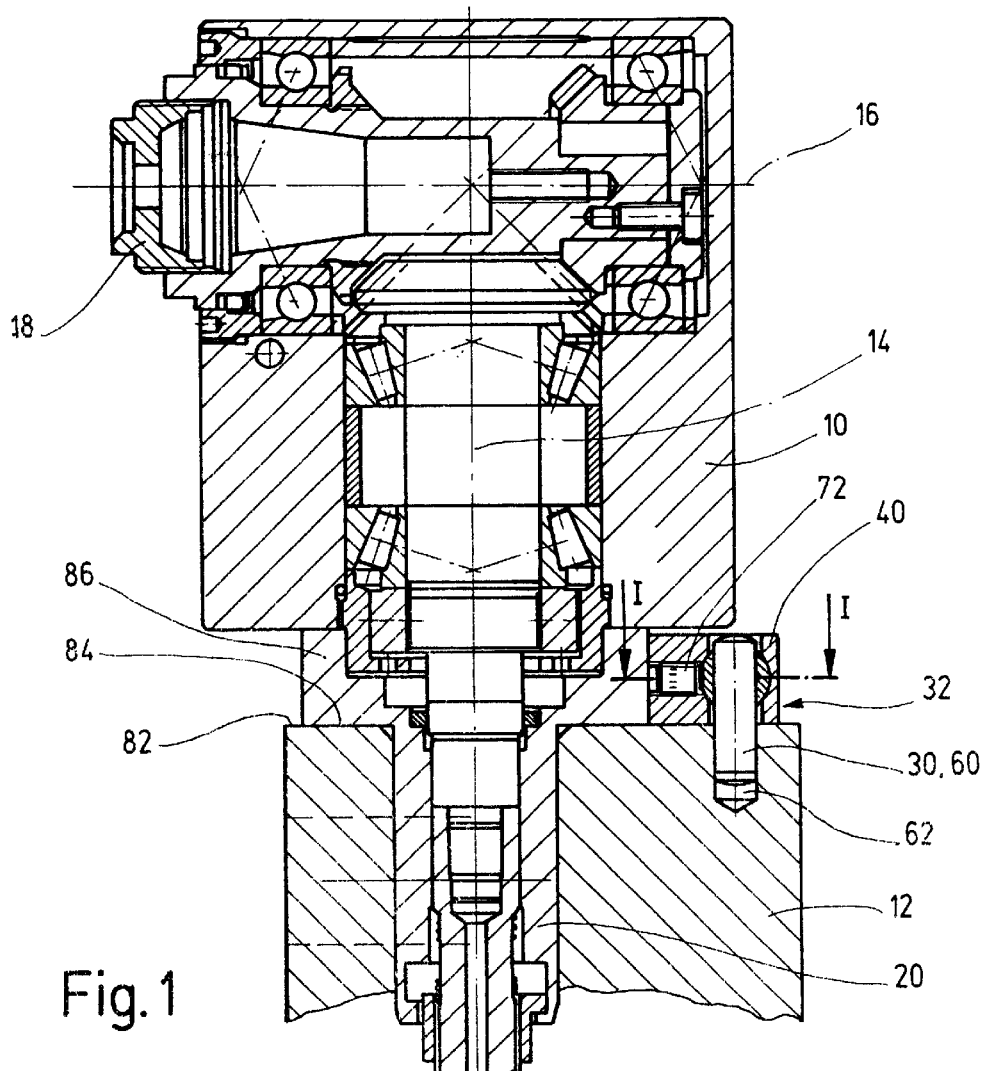
FIG. 1 is a side elevational view in section of a toolholder arranged in a toolholder mounting in the form of a wedge-like spindlehead according to the present invention.

The adjustment and/or alignment arrangement of the present invention serves for positioning of a toolholder 10 relative to a toolholder mounting 12 in machine tools, especially turning machines (not shown). Toolholder 10 can be in the form of a wedge-shaped spindlehead with a first driving axle or axis 14. In order to drive a cutting tool (not shown), first driving axle 14 drives a second driving axle or axis 16 extending perpendicular to the first axle. The aforementioned cutting tool is conventional, and thus, is not described further, and can be inserted over the tool mounting 18, driven by driving axles 14 and 16 for a manufacturing process. The first driving axle 14 is guided rotatably in a toolholder shaft 20, provided with teeth 22 around the exterior periphery in a conventional manner. If toolholder 10 is inserted through its toolholder shaft 20 into the associated circular toolholder mounting 12, corresponding teeth 26 of a clamping 24, according to a position shown in FIG. 2, engage teeth 22 toolholder shaft 20, and thus, affix the wedge-like spindlehead tightly on toolholder mounting 12. For the release of clamping member 24, it is moved back along its longitudinal axis 28, whereupon the teeth 22 and 26 are disengaged with one another and toolholder 10 is released.

Figure 3:
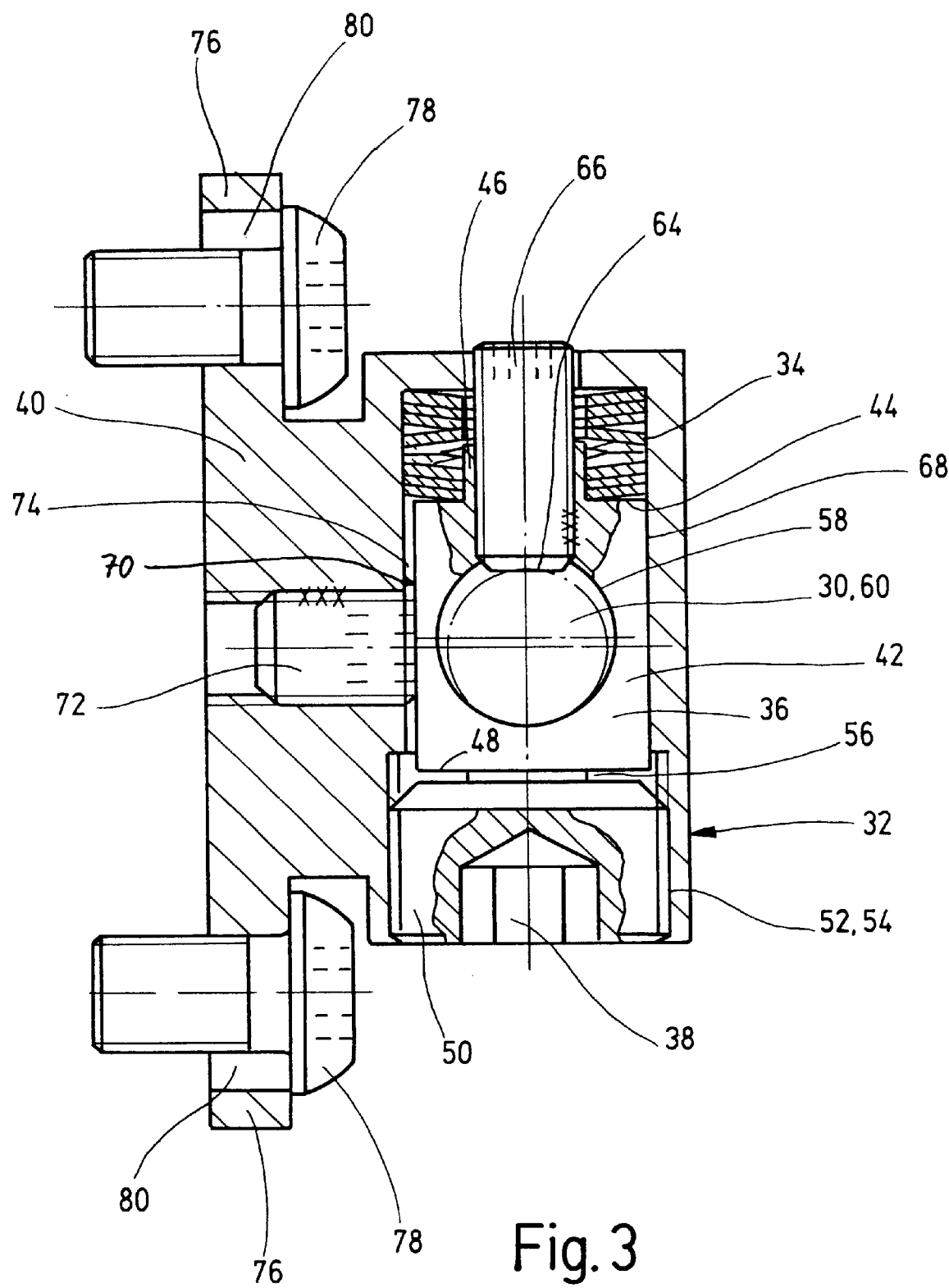
FIG. 3 is an enlarged top plan view in section of the adjustment and/or alignment arrangement of FIG. 1.

In the case of rotary processing, first driving axle 14 can extend along the normal or vertical axis of the turning machine. Consequently, second driving axle 16 is at a right angle to driving axle 14. With counter-rotation of the spindle, the arrangement of toolholder 10 is such that second driving axle 16 is aligned parallel to the vertical axis of the turning machine and first driving axle 14 is perpendicular thereto, transverse to the turning machine vertical axis. In both cases, however, the tool point of the cutting tool, and consequently the second driving axle 16, is aligned exactly in relation to the vertical axis, in order to avoid inaccuracies. For this purpose, the adjustment and/or alignment arrangement has an adjustment part 30 which cooperates with a setting part indicated in it entirety as 32. As is shown particularly in FIG. 3, setting part 32 has a mobile guiding part 36 guiding adjustment part 30 counter to the effect of force accumulator 34, whereby guiding part 36 can be controlled by operation part 38.

As shown particularly in FIG. 1, adjustment part 30 is mounted securely on toolholder mounting 12, and setting part 32 is in turn securely mounted on toolholder 10. Setting part 32 is provided with a mounting housing 40, in which the guiding part 36 in the form of a sliding block 42 is longitudinally slidably guided. Guiding part 36 incorporates an engagement point for adjustment/alignment part 30. Accumulator 34 is formed of at least one disk spring or a plurality of disk springs arranged one behind the other in series. As is particularly clear in FIG. 3, these disk springs engage with their one free end on the one end 44 of sliding block 42 and are supported with their other end on the interior of mounting housing 40. For the formation of a specific contact surface for accumulator 34 in the form of the disk spring arrangement, sliding block 42 has a shelf-like ledge 46 at the associated end. The shelf-like ledge of the disk spring arrangement is at least partially surrounded. Shelf-like ledge 46, however in any case, is at sufficient distance from the interior of mounting housing 40 that the open spring path of the disk spring arrangement is not blocked. Besides, with the shelf-like ledge 46, there is a detent capacity relative to mounting housing 40 in case of overload or breakdown of accumulator 34.

The other side 48 of sliding block 42 engages operation part 38 in the form of an operating screw 50. Screw 50 has an interior hexagonal cutout for the engagement of a operating tool (not shown), for example, an interior hexagonal wrench. Operating screw 50 is guided into and out of mounting housing 40 by means of its exterior threading 52 and interior threading 54 of the housing. A separate structural part strikes with a detent part 56 on the other end 48 of sliding block 42. Under the effect of accumulator 34, sliding block 42 is pressed on the detent part 56 of operating screw 50. Interior threading 54, which opens into the environment, is cut in such a manner into a length of mounting housing 40 that the entire pivot path provided for second driving axle 16 and consequently for toolholder 10 is obtained.

Sliding block 42 has a middle bore 58 as an engagement point. The diameter of bore 58 is greater than the diameter of adjustment part 30 in the form of an adjustment pivot pin 60. As shown particularly in FIG. 1 pivot pin 60 is received and fitted tightly in a shaped bore 62 in toolholder mounting 12. Within middle bore 58, in turn, a detent surface 64 for pivot 60 is provided and is part of a detent screw 66. Detent screw 66 extends through the middle of the disk spring arrangement and is screwed into sliding block 42. The free end of detent screw 66 is guided movably in the wall of mounting housing 40, and can be secured by means of a traditional Loctite connection within the interior threading of sliding block 42. At the free end of detent screw 66, an engagement point for an operating tool (not shown) is present for moving detent screw 66 within sliding block 42, to limit the free space within middle bore 58 of sliding block 42.

An anti-torsion member 70 (FIG. 3) is provided so that with such a setting process, sliding block 42 cannot be turned within its guide 68. Anti-torsion member 70 has a set screw 72 which is threadedly engaged in mounting housing 40. One free contact end of set screw 72 is engaged in a longitudinal groove 74 of sliding block 42. Thus, on the one hand an effective anti-torsion member 70 is supplied. On the other hand, the longitudinal mobility of mounting housing 40 relative to sliding block 42 is guaranteed, the same as before. Also, set screw 72 can be clamped permanently by a traditional Loctite connection within mounting housing 40.

Mounting housing 40 has a flange-like extension 76 on both mounting housing sides in the area of the engagement of set screw 72. Each extension is penetrated by a clamping screw 78, which serves (FIG. 2) for subsequent clamping of setting part 32 on toolholder 10. In order to be able to attain a certain tolerance equalization for this clamping, clamping screws 78 extend through enlarged bores 80 within flange-like extensions 76. Consequently the distance between the clamping screws 78 can be varied.

As shown in FIG. 1, adjustment part 30 projects position-centered over the specific bearing surface 82 of toolholder mounting 12, i.e., defines a center position for the apparatus and can be overlapped by setting part 32 in extension of contract surface 84 of toolhholder 10 for engagement. Bearing surface 82 and contact surface 84 are made to provide in exact plane-parallel contact of toolholder 10 on toolholder mounting 12. Setting part 32 engages on the side of a projecting shelf-like ledge 86 of toolholder 10. Shelf-like ledge 86 is at a slightly greater height than setting part 32 when viewed in alignment with adjustment part 30.

The adjustment and/or alignment arrangement according to the present invention is now described in greater detail by one exemplary, practical adjustment procedure. First the middle bore 58 of sling block 42 is adjusted with detent screw 66 for diameter adjustment to relate to the diameter of adjustment pivot pin 60. Then, mounting housing 40 is clamped by means of clamping screw 78 onto toolholder 10, especially at its projecting shelf-like ledge 86. Since the diameter of pin-like adjustment pivot pin 60 is of very narrow tolerance, the basic setting preferably occurs only one time during the tool manufacture. In the later operation, on site, the basic setting can be corrected upon the appearance of spots of wear on adjustment pivot pin 60 or with modification of the angle setting.

Figure 2:
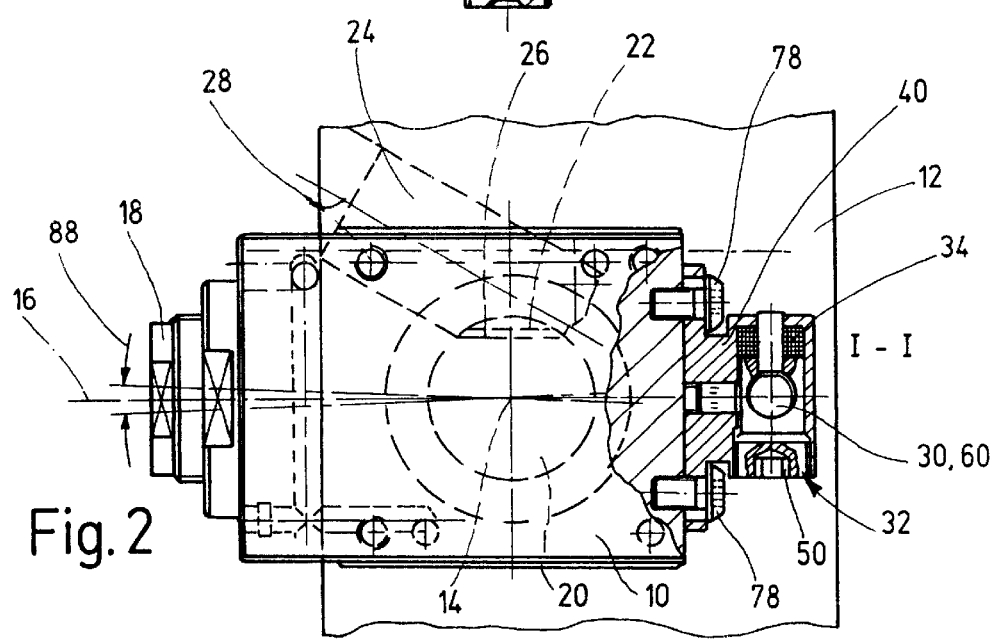
FIG. 2 is a partial top plan view in section of the wedge-like spindlehead taken along line I—I of FIG. 1.

Toolholder 10 is then set in the mounting opening of toolholder mounting 12, for example, of a set-up theory or pattern. Approximately 10 to 25% of the maximum clamping force is clamped/tightened over clamping member 24. However it is also possible to undertake the setting on the machine directly. Subsequently, toolholder 10 and consequently both driving axles 14 and 16 are set in their angular settings, while operating screw 50 thrusts sliding block 42 against the force of the disk spring arrangement (accumulator 34). Thus, toolholder 10 can be rotated, first of all around first driving axle 14 and in such a manner as to carry along second driving axle 16 in a pivotal direction, which stands in alignment in FIG. 1 perpendicular to the plane of the drawing. FIG. 2 indicates the possibility of deflection of second driving axle 16 in both directions around its midpoint indicated by arrows 88.

The force of the spring arrangement is preferably set so that it is in any case greater than the processing forces of the cutting tool of toolholder 10 effecting the angle setting. Basically, sliding block 42 remains in its clamped position on adjustment pivot pin 60. With operation of operating screw 50, mounting housing 40, projecting shelf-like ledge 86 and toolholder 10 are moved around a path preterminable by first driving axle 14. If the operating screw 50 is driven in the clockwise direction, second driving axle 16 likewise pivots in the clockwise direction and vice versa, so that the operator effectively finds an adequate operation for the angle adjustment.

While a particular embodiment has been chosen to illustrate the invention, it will be understood by those skilled in the art that various changes and modifications can be made therein without departing from the scope of the invention as defined in the appended claims.

What is claimed is:

1. An adjustment arrangement for pivotally positioning a toolholder relative to a toolholder mounting in a machine tool, comprising:
    an adjustment part; and
    a setting part coupled to said adjustment part, said setting part having
        a mounting housing,
        a guiding part receiving said adjustment part and being guided for longitudinal sliding motion in said mounting housing,
        an accumulator biasing said guiding part in one longitudinal direction of the sliding motion of said guiding part, and
        an operation part controlling said guiding part in an opposite longitudinal direction of the sliding motion of said guiding part.

2. An adjustment arrangement according to claim 1 wherein
    said adjustment part is mounted fixedly on a toolholder mounting; and
    said setting part is mounted fixedly on a toolholder.

3. An adjustment arrangement according to claim 1 wherein
    said guiding part is a sliding block having an engagement point for said adjustment part.

4. An adjustment arrangement according to claim 3 wherein
    said accumulator comprises at least one compression spring engaged on one longitudinal end of said sliding block; and
    said operation part comprises an operating screw engaged on an opposite longitudinal end of said sliding block.

5. An adjustment arrangement according to claim 4 wherein
    said compression spring comprises a disk spring.

6. An adjustment arrangement according to claim 3 wherein
    said sliding block comprises a middle bore forming said engagement point, said middle bore having a bore diameter; and
    said adjustment part is an adjustment pivot pin having a pin diameter, said bore diameter being greater than said pin diameter.

7. An adjustment arrangement according to claim 6 wherein
    a detent surface for said adjustment pivot pin is arranged within said middle bore.

8. An adjustment arrangement according to claim 7 wherein
    said detent surface is on a detent screw mounted in and engaging said sliding block and extending through said accumulator.

9. An adjustment arrangement according to claim 3 wherein
    said mounting housing comprises an anti-torsion member engaging and guiding movement of said sliding block.

10. An adjustment arrangement according to claim 2 wherein
    said adjustment part projects from a contact surface of said toolholder mounting and defines a center position thereof; and
    said setting part overlaps an extension of a control surface of said toolholder.

11. An adjustment arrangement according to claim 2 wherein
said toolholder is an angular spindlehead which is clamped detachably to said toolholder mounting by a clamping member.

12. An adjustment arrangement according to claim 1 wherein
said adjustment part is fixedly mounted on one of said toolholder and said toolholder mounting;
said setting part is fixedly mounted on the other of said toolholder and said toolholder mounting; and
said toolholder and said toolholder mounting are pivotally adjustable.

13. An adjustment arrangement, comprising:
a toolholder mounting;
a toolholder pivotally adjustable relative to said toolholder mounting;
an adjustment part fixedly mounted on one of said toolholder and said toolholder mounting; and
a settling part fixedly mounted on the other of said toolholder and said toolholder mounting and coupled to said adjustment part, said setting part having
a mounting housing,
a guiding part receiving said adjustment part and being guided for longitudinal sliding motion in said mounting housing,
an accumulator biasing said guiding part in one longitudinal direction of the sliding motion of said guiding part, and
an operation part controlling said guiding part in an opposite longitudinal direction of the sliding motion of said guiding part.

14. An adjustment arrangement according to claim 13 wherein
said toolholder comprises a driving axle having an axis of rotation; and
said toolholder pivots relative to said toolholder mounting about said toolholder axis.

* * * * *